July 11, 1967 R. N. ATKINSON 3,330,120
WEEP VALVE WITH INSERTING DEVICE
Filed Dec. 28, 1964 3 Sheets-Sheet 1

INVENTOR.
Ray N. Atkinson
BY
Attorney

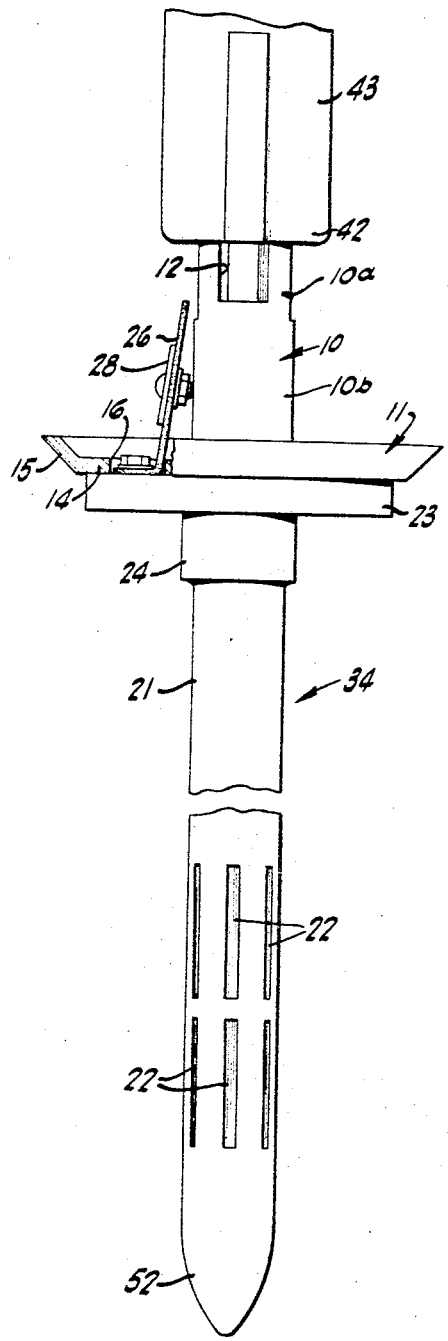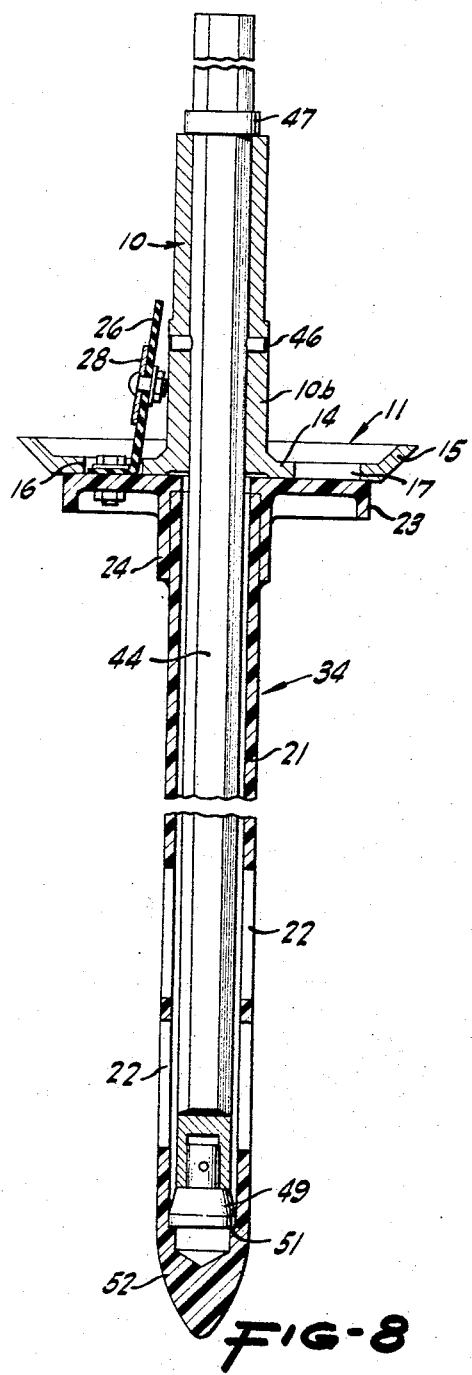

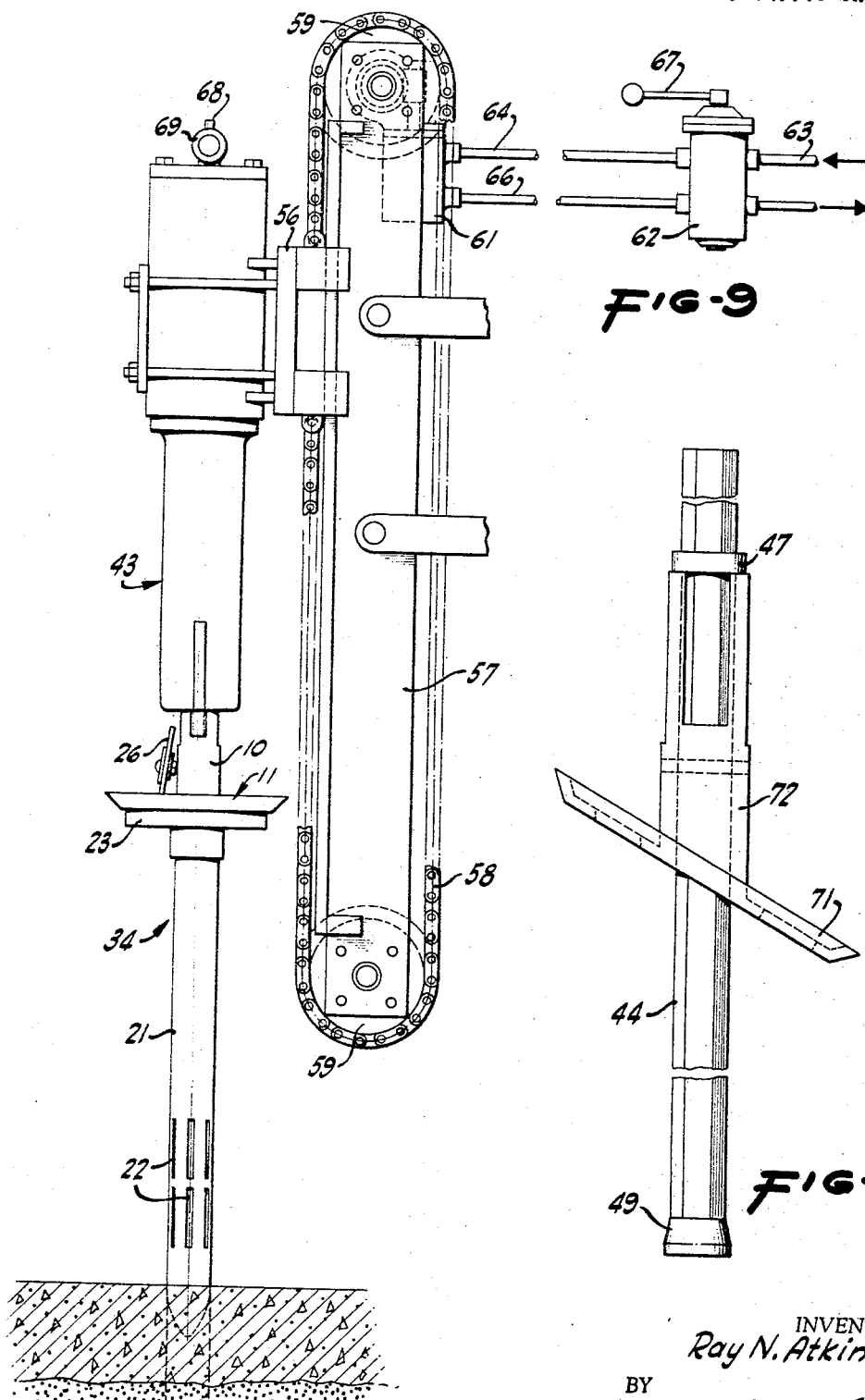

United States Patent Office 3,330,120
Patented July 11, 1967

3,330,120
WEEP VALVE WITH INSERTING DEVICE
Ray N. Atkinson, Hillsborough, Calif., assignor to Guy F. Atkinson Company, South San Francisco, Calif., a corporation of Nevada
Filed Dec. 28, 1964, Ser. No. 421,534
9 Claims. (Cl. 61—10)

This invention relates generally to devices for the insertion of weep valves such as are employed in concrete lined canals.

In the construction of large water canals, it is sometimes necessary to provide weep valves for permitting water in certain drainage regions and under certain conditions to flow into the canal. One type of weep valve that has been specified by the Bureau of Reclamation of the United States Department of the Interior consists of a perforated tube formed of plastic material. The tube has a disk-like head likewise formed of plastic material and which carries a simple flap valve that normally closes the tube opening. In the past, such valves have been inserted by punching or drilling a hole through the freshly laid concrete lining, after which the valves have been inserted by hand. When the valves are of extended length, it is advisable to use power means for their insertion, such as a vibrator or pneumatic impacting tool. The connection of the valve to the vibrator or impacting tool for an inserting operation must be such as to effectively impart vibration and downward force to the valve without injuring the valve flap or the plastic material of which the valve is made.

In general, it is an object of the present invention to provide a novel weep valve inserting device which facilitates forming an operative connection between the weep valve and an associated vibrator or pneumatic impacting tool and which serves to impart downward impact forces to the weep valve without injury.

Another object of the invention is to provide a device of the above character which avoids injury to the valve flap of the weep valve.

Additional objects and features of the invention will appear from the following description in which the preferred embodiments have been set forth in detail in conjunction with the accompanying drawing.

Referring to the drawing:

FIGURE 7 is a side elevational view, partly in section, showing the valve of FIGURE 3 applied to the driving head of FIGURE 1;

FIGURE 8 is a side elevational view in section showing the manner in which the mandrel is carried by the head and is disposed within the weep valve;

FIGURE 9 illustrates a weep valve inserting operation; and

FIGURE 10 is a side elevational view of another embodiment of the head adapted particularly for making an insertion in the slope of a canal.

Figure 1:
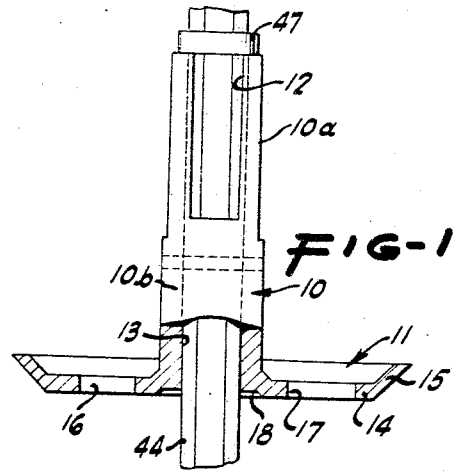
FIGURE 1 is a side elevational view partly in section illustrating a driving head incorporating the invention.
Figure 2:
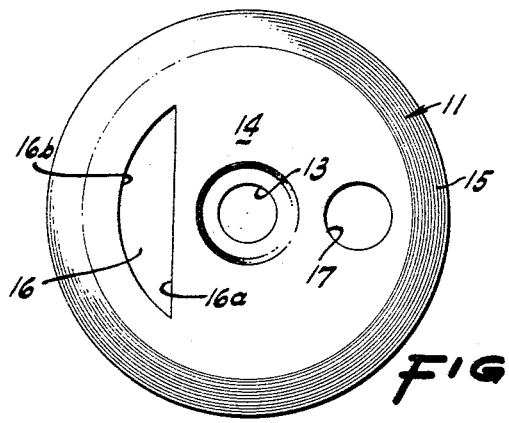
FIGURE 2 is a bottom plan view of the driving head shown in FIGURE 1.

Referring first to FIGURES 1 and 2, I have shown a driving head consisting of the shank portion 10 together with the disk-like portion 11. The portion 10a of the shank 10 may be provided with a slot 12 to facilitate application to a pneumatic impacting tool and to maintain proper orientation. Both the portions 10a and 10b of the shank may be provided with the central opening 13 for accommodating a mandrel. In manufacture the head can be made from a suitable steel casting or by fabrication. The disk-like portion 11 consists of the flat wall 14 having a substantially conically shaped peripheral rim 15. Openings 16 and 17 are formed in the wall 14 and serve the purpose to be presently described. Opening 16 may be crescent shaped as illustrated with the edge 16a being straight, and the edge 16b arcuate. Recess 18 is shown to provide clearance for a raised seating surface in the weep valve.

Figure 4:
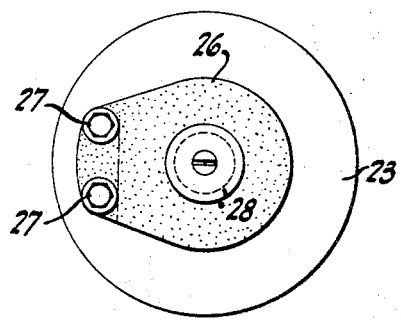
FIGURE 4 is a plan view of the weep valve shown in FIGURE 3.
Figure 3:
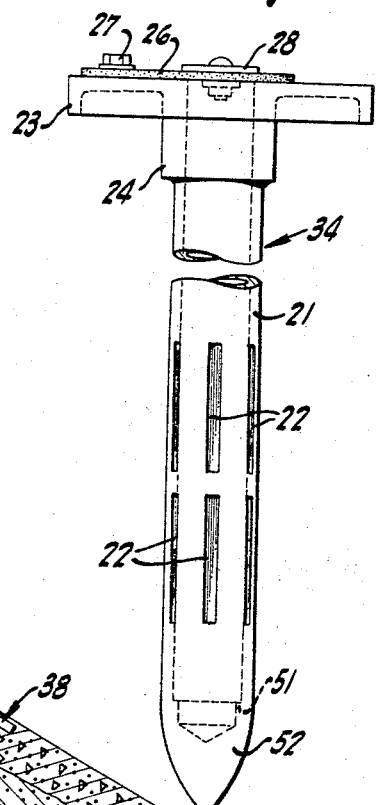
FIGURE 3 is a side elevational view showing a weep valve of the kind which is inserted by the present device.

FIGURES 3 and 4 illustrate a typical plastic weep valve such as is specified by the Bureau of Reclamation of the Department of the Interior. It consists of a tube 21 provided with perforations or slots 22 in its lower portion and with a disk-like head 23 at its upper end. The head 23 may be recessed and ribbed on its lower side and is provided with a hub 24 for reinforcing its attachment to the tube. On the flat top surface of the head 23 there is a simple flap valve 26. This can be a piece of resilient synthetic rubber attached as by screws 27 to the head 23 and provided with a weighting disk 28. It will be evident that the flap valve is normally closed and that it is moved to open position by a fluid pressure within the tube which exceeds the fluid pressure from the canal.

Figure 5:
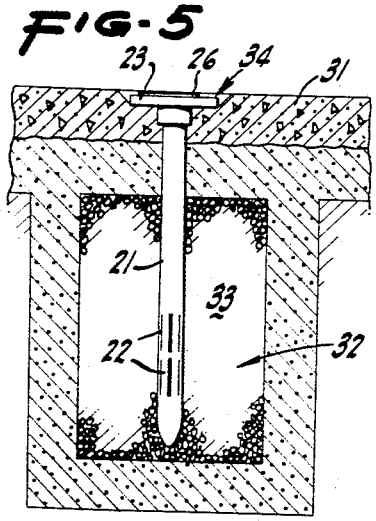
FIGURE 5 is a section illustrating the weep valve of FIGURE 3 installed in a canal lining.

FIGURE 5 illustrates how such weep valves are installed within the floor or invert portion of a water canal. The portion of the canal illustrated includes the concrete lining 31 and a drainage region 32 which is filled with sand and a gravel core 33. The weep valve designated generally at 34 has its lower perforated end within the gravel core 33 and its head 23 is inset within the upper surface of the lining 31. It will be evident that when installed in this manner the weep valve under certain conditions will permit water accumulating in the drainage area 32 to flow into the canal.

Figure 6:
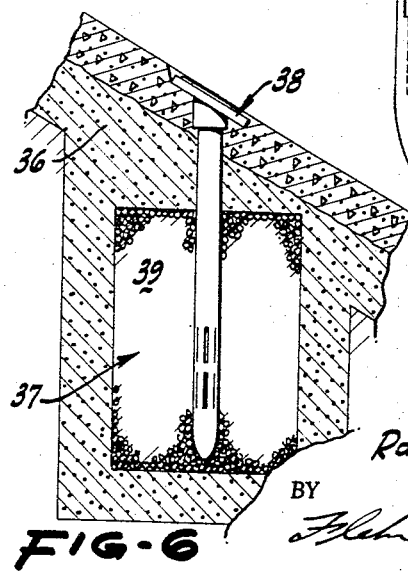
FIGURE 6 is a view like FIGURE 5 but showing the weep valve installed in the slope of a canal.

FIGURE 6 illustrates a similar installation in the sloping sides of the canal. In this instance water may drain through the areas 36 which extend laterally of the sides of the canal and such drainage may accumulate within the sump areas 37. The weep valve designated generally at 38 in this instance has a head tilted to the angle of the slope and its lower portion terminates within the gravel core 39 of the drainage area 37.

FIGURES 7 and 8 illustrate how the driving head of FIGURES 1 and 2 is assembled with a mandrel and employed for inserting a weep valve. In this instance the driving head has its shank portion 10a within the chuck 42 of the vibrator or pneumatic impacting tool 43. The driving head 11 has been seated upon the upper face of the head 23 of the weep valve 34. The valve flap 26 has been lifted and positioned whereby it extends through the opening 16. In such position it is not exposed to injury and it does not interfere with good driving contact between the lower face of the driving head 11 and the top face of the valve head 23. The mandrel 44 is extended through the shank portion 10b and is attached thereto as by means of the pin 46. This mandrel can be hexagonal in section as illustrated. It has a collar 47 which seats upon the upper end of shank 10. At its lower end the mandrel 44 can be provided with a foot 49 which engages a ledge or shoulder 51 on the lower pointed end portion 52 of the tube 21. Where the valve has sufficient strength for the materials through which it is being inserted, this foot can be omitted. With the assembly of FIGURES 7 and 8 the impacts from the pneumatic hammer are effectively transmitted to the valve, whereby the valve can be effectively driven. The latch means ordinarily provided in pneumatic impacting tools is accommodated by slot 12 to engage beneath collar 47 and thus retain the assembly in operating position.

In FIGURE 9 there is shown means to support the pneumatic impacting tool 43 for vertical movements. Thus, the tool 43 is secured to a carriage 56 that is slidably carried by the guide rack 57. The impacting tool in this instance may be a pneumatic paving breaker, e.g. a model B87B paving breaker made by Gardner-Denver Company. The rack, in turn, may be carried by a suitable supporting structure such as the frame of a finishing jumbo. Power means for raising and lowering the carriage 56 can consist of the chain 58 engaging the sprockets 59, with one sprocket being geared to a pneumatic motor 61. The pneumatic connections may include a control valve 62 connected by pipe 63 to a source of air under pressure, and connected by pipes 64 and 66 to the motor 61. Thus, by operating valve handle 67 the motor can be operated in one direction or the other to raise or lower the hammer. The control member 68 serves to control supply of air to the hammer.

FIGURE 9 also illustrates how the assembly described above is used to drive a weep valve into operating position. It will be noted that the driving head has been inserted within the chuck 42 and that the lower end of the weep valve has somewhat penetrated the concrete lining 31. It will be understood that the lining at this time has not hardened to any substantial degree, or in other words, it is relatively freshly laid.

Before attempting to insert the weep valve it may be desirable to first punch a hole through the lining and into the drainage area, as by means of any suitable drill or punching tool. This tool can be a simple drill rod or moil point that is inserted in the chuck 42 before the driving head is applied.

During the final part of the inserting of the valve, the head 23 is forced below the upper surface of the concrete and the conical shaped rim 15 of the driving head is likewise forced a certain distance into the concrete, thereby forming an annular depression surrounding the head. After driving the weep valve into the position desired, the impacting tool and the driving head are raised whereby the mandrel is retracted and the weep valve left in the desired position. If the valve tends to cling to the head it can be held down by a suitable tool inserted through opening 17. Immediately thereafter it is customary to flush out the weep valve and the tube perforations by application of water, and it is also desirable to hand finish about the head 23.

FIGURE 10 shows a driving head for the insertion of weep valves in a side slope. Here the disk-like portion 71 is inclined at an angle corresponding to the slope. The shank 72 and the mandrel are substantially the same as in FIGURES 1 and 2.

In general, my invention provides effective means for inserting weep valves or comparable devices. It is convenient and simple to operate, and it does not damage any part of the valve.

I claim:
1. In combination with a valve for permitting liquid in a drainage space to flow into a canal wherein the valve comprises a perforated tube together with a head attached to one end of the tube and a valve flap movably attached to the head and adapted to engage the top surface of the head and to be unseated by pressure within the tube, the improvement which comprises:
   means for inserting the valve into the drainage space which includes,
   a driving head having a disk-like portion and having its bottom face adapted to establish abutting driving contact with the top surface of the valve head and having an opening for accommodating the valve flap, said head being adapted to receive driving force to effect insertion of the valve, and
   a mandrel insertable into the tube and attached to the driving head for establishing driving contact with the lower end of the valve tube.

2. In the combination as in claim 1 in which said opening in the driving head is in the form of a slot adapted to accommodate said flap.

3. In the combination as recited in claim 2 wherein said disk-like portion has a conical outer periphery.

4. In the combination as recited in claim 3 wherein said mandrel has a foot at its lower end for establishing driving contact with the lower end of the valve tube.

5. In the combination as recited in claim 4 which further includes vertically adjustable impact means for applying driving force to the head.

6. In the combination as in claim 1 together with a vertically adjustable impact means for applying driving force to the head.

7. In the combination as in claim 1 in which said disk-like portion has a conical shaped outer periphery.

8. In the combination as in claim 1 in which the mandrel has a foot at its lower end for establishing driving contact with the lower end of the valve tube.

9. In the combination as recited in claim 1 wherein said disk-like portion of the driving head is mounted at an angle with respect to the vertical axis of the mandrel, said angle corresponding to the angle of the outer wall of the canal into which the valve is to be inserted.

References Cited

UNITED STATES PATENTS

| | | | |
|---|---|---|---|
| 1,403,766 | 1/1922 | Gillies | 61—53.72 |
| 1,847,853 | 3/1932 | Watt | 61—53.72 |
| 1,998,643 | 4/1935 | Thornley | 61—53.7 |
| 2,050,215 | 8/1936 | Watt | 61—53.7 |
| 2,972,871 | 2/1961 | Foley | 61—53.7 |
| 3,183,984 | 5/1965 | Durston et al. | 61—10 X |

EARL J. WITMER, *Primary Examiner.*